US006806232B1

United States Patent
Cart

(10) Patent No.: US 6,806,232 B1
(45) Date of Patent: Oct. 19, 2004

(54) COMPOSITION OF DRILLING FLUIDS COMPRISING GROUND ELASTOMERIC CRUMB RUBBER MATERIAL AND A METHOD OF DECREASING SEEPAGE AND WHOLE MUD LOSS USING SUCH COMPOSITION

(76) Inventor: Steve Cart, 19117 W. Hwy. 90, Crowley, LA (US) 70527

( * ) Notice: Subject to any disclaimer, the term of this patent is extended or adjusted under 35 U.S.C. 154(b) by 12 days.

(21) Appl. No.: 09/870,871

(22) Filed: May 31, 2001

(51) Int. Cl.[7] ............................. C09K 7/06; C09K 7/02
(52) U.S. Cl. ....................... 507/118; 507/117; 507/107; 507/108; 507/111; 507/113; 507/119; 507/126; 507/219; 507/221; 507/206; 507/207; 507/212; 507/215; 507/224; 507/232; 507/903
(58) Field of Search ................................ 507/117, 118, 507/107, 108, 111, 113, 119, 126, 219, 221, 206, 207, 212, 215, 224, 232, 903; 523/130

(56) References Cited

U.S. PATENT DOCUMENTS

| 2,743,233 A | * | 4/1956 | Fisher .......................... 507/118 |
| 2,894,906 A | * | 7/1959 | Sheeler ........................ 507/118 |
| 4,182,677 A | | 1/1980 | Bocard |
| 4,425,462 A | | 1/1984 | Turner |
| 4,428,843 A | | 1/1984 | Cowan |
| 4,531,594 A | | 7/1985 | Cowan |
| 4,664,816 A | | 5/1987 | Walker |
| 4,704,213 A | | 11/1987 | Delhommer |
| 5,071,575 A | | 12/1991 | House |
| 5,076,944 A | | 12/1991 | Cowan |
| 5,087,611 A | | 2/1992 | Forrest |
| 5,102,866 A | | 4/1992 | Forrest |
| 5,229,018 A | | 7/1993 | Forrest |
| 5,246,602 A | | 9/1993 | Forrest |
| 5,806,592 A | | 9/1998 | Forrest |
| 5,826,669 A | | 10/1998 | Zaleski |
| 5,861,362 A | | 1/1999 | Mayeux |
| 6,518,224 B2 | * | 2/2003 | Wood .......................... 507/118 |

FOREIGN PATENT DOCUMENTS

SU          1121396 A    * 10/1984

OTHER PUBLICATIONS

Kirk–Othmer, Encyclopedia of Chemical Technology, vol. 7, 2$^{nd}$ Edition, pp. 297–299, (1965).*

* cited by examiner

Primary Examiner—Philip C. Tucker
(74) Attorney, Agent, or Firm—Russel O. Primeaux; Kean, Miller, Hawthorne, D'Armond, McCowan & Jarman, LLP

(57) ABSTRACT

Well-working fluid compositions containing certain processed inorganic, oil and water wettable ground elastomeric crumb rubber materials to decrease the seepage loss of various fluids to subterranean formations in which these well working fluids are required and utilized are disclosed. Also disclosed is a method of reducing the seepage and whole mud loss of these well working fluids utilizing such ground elastomeric crumb rubber materials.

16 Claims, 2 Drawing Sheets

COMPOSITION OF DRILLING FLUIDS COMPRISING GROUND ELASTOMERIC CRUMB RUBBER MATERIAL AND A METHOD OF DECREASING SEEPAGE AND WHOLE MUD LOSS USING SUCH COMPOSITION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

This invention relates, generally, to a composition of drilling fluids designed to decrease seepage and whole mud loss during well-working operations.

2. Description of Related Art

In the rotary drilling of wells, such as for oil and gas exploration, a mechanical means (triplex or duplex pump) of circulating drilling fluids is required in order to force the drilling fluids through a column of mechanically connected drilling pipe known as the drill string. A drilling bit or other well working tool connected to the lower end of the drill string, in combination with the mechanically induced rotating action of said drill string, drill bit, and/or other well working tool, causes the subterranean formation to be drilled.

These drilling fluids, known collectively as "mud" in the industry, perform specific required functions. These include, but are not limited to, (1) removing the drilled "cuttings" of subterranean formation from the well bore ("hole"); (2) controlling subsurface pressures; (3) cooling and lubricating the drill string, drill bit and/or drilling tools; (4) forming a thin and impermeable wall cake; (5) carrying information about the subterranean formations being penetrated; (6) suspending drilled cuttings and density materials when circulation is stopped; and (7) bearing a portion of the weight of the drill string through buoyancy.

These drilling fluids have a base of, but are not necessarily limited to, oil or water of varying salinity. Water-based fluids may contain, for example, bentonetic clay, polymers, materials to alter density, and other additives mixed and/or dispersed in the water. Oil-based fluids (diesel or synthetic) may contain, for example, suspending agents or materials (generally organophilic clays), wetting agents, emulsifiers, stabilizing agents, filtration agents, density agents, and other additives suspended or dispersed in diesel or synthetic oil and like oleaginous mediums.

The characteristics of the drilled geologic strata and, to some extent, the drilling apparatus, determine the physical parameters required of a drilling fluid. For example, while drilling through a high pressure subterranean formation layer, e.g., a gas formation, the density of the drilling fluids must be increased such that the hydrostatic head of the fluid column is greater than, or at balance with, the downhole pressure of the stratum to prevent gas or oil leakage into the annular space surrounding the drill string, thus lowering the chances of a "blowout" situation.

The particle size in most common drilling fluids is, as a general rule, from about 0.5 to 5.0 microns in size, with a small percentage (5% or less) of the particles being as large as 44 microns (325 mesh). The particles above this range are generally removed in the process of re-conditioning and separation of the rock cuttings prior to the re-circulation of the drilling fluid. Due to the constant cleaning, conditioning and removal of larger particles, drilling fluids as they are normally used can bridge only small fissures (generally less than 0.002 inches) within the subterranean formations.

In strata that are porous in nature, having openings or fissures larger that about 0.001 to 0.002 inches, as well as having a low subterranean formation pressure, another commonly known problem exists. Some of the drilling fluid, because its hydrostatic column head pressure is greater than the subterranean formation pressure, migrates out into the porous layers rather than completing its circuit journey back to the earth's surface.

This phenomenon makes it extremely desirable to be able to control the deposition of a low-permeability filter cake (wall cake) onto the sides of the well bore by controlling the properties of the drilling fluid. A wall cake results when the drilling fluid exerts a greater pressure than that of the subterranean formation. The initial drilling fluid that inevitably enters the subterranean formation as the wall cake is being deposited is known as spurt loss. Liquid that enter the subterranean formation after the cake has been deposited is known as drilling fluid filtrate.

If the fluids enter the subterranean formation in significant quantities, it is known as whole mud loss. This whole mud loss refers to the whole mud and includes but is not necessarily limited to, the filtrate loss and the loss of fluids in greater quantities than that considered to be fluid or seepage loss, due to such things as a fracture or vulgular subterranean formation.

In some situations, the whole mud loss may be so extreme that all well-working fluids pumped into the well bore are lost completely to subterranean sand or a vulgular formation. Such condition is known as severe or total loss to those familiar in the art.

The filtration properties required for a successful completion of a well depend on the nature of the subterranean formation being drilled and on the type of drilling fluid used. For example, in water sensitive formations, diesel or synthetic oil base drilling fluids provide superior hole stabilization when the salinity of the aqueous phase of the drilling fluid is adjusted to prevent migration of water from the drilling fluid to the subterranean formations. The filtration must be minimized through the entire drilling process, especially when using diesel or synthetic oil base drilling fluids, due to the high cost of these fluids.

Over the years, many materials have been used for in an attempt to decrease and control the filtration rate of these drilling fluids. For example, starch and starch derivatives, cellulose derivatives, humates, lignin derivatives, and various clay materials have all been used in water base drilling fluids. Similarly, asphaltic materials, organophilic clays, organophilic humates, organic lignosulfonates and the like have been used in diesel and synthetic oil base drilling fluids.

All things considered, there are very few materials effective in decreasing spurt loss or seepage of whole mud to the subterranean formation. Some of the many materials which have been used include cottonseed hulls and lentils, ground corn cobs, rice hulls, peanut shells, ground sheet mica, shells of various nuts, coal, asbestos, bagasse, paper and various particulate wood products. Accordingly, there is a need for an effective seepage and spurt control loss agent, and additionally a control agent for total and severe whole mud loss to the subterranean formation.

SUMMARY OF THE INVENTION

It is an object of the present invention to provide a well-working composition sufficient to seal fluid loss through permeable subterranean sand formations of as small as 1 Darcey to those formations that loose whole mud at a rate of approximately 100 barrels (42-gallon oilfield barrel) or more per hour.

It is another object of the present invention to provide a material additive that is capable of bridging and sealing permeable subterranean formations better than materials currently utilized for this purpose.

It is another object of the present invention to provide well-working compositions having a low seepage or spurt loss.

It is another object of this invention to provide a method of decreasing the seepage or spurt loss during a well working operation.

It is yet another object of the present invention to provide the foregoing functionality in water base, oil base, and synthetic oil base fluids.

These, and other objects of this invention will appear to one skilled in the art as the description thereof proceeds.

The novelty of this invention is a new and unique particulate material to be added to bore hole fluids, also known as well working fluids or drilling fluids, to minimize and stop whole mud loss to permeable formations encountered while drilling subterranean formations.

The particulate, ground elastomeric crumb rubber sealant material, exhibits resiliency and compressibility that differentiate it from previous and currently utilized particulate materials. Current particulate materials used for seepage and whole mud loss control applications range from the rigid inorganic minerals (i.e.; calcium carbonate, iron ore slag, mica, ground Formica, plastic, etc.) to organic materials derived from plant sources (is; cotton seed hulls, peanut hulls, corn cobs, woods, etc.).

Ground elastomeric crumb rubber sealant material exhibits the compressibility and deformability of organic materials, while maintaining rigidity after being compressed. This enables the ground elastomeric crumb rubber sealant material to bridge spaces hydraulically opened by hydrostatic pressures, yet compress and deform to close areas between the particles, sealing the void.

The ground elastomeric crumb rubber sealant material is added in quantities of about 1 ppb (pound per barrel) to 100 ppb. To ensure that the material does not adversely effect the normal properties of the particular well working fluid in use, the preferable concentration of crumb rubber material is from about 1 ppb to about 20 ppb, depending on the density of the fluid it's added to.

The invention also relates to compositions for use in well working operations, well-working processes utilizing such compositions, and an additive to reduce the seepage loss and the total and/or severe whole mud loss of the compositions to the subterranean formations.

DETAILED DESCRIPTION OF THE INVENTION

Figure 1:
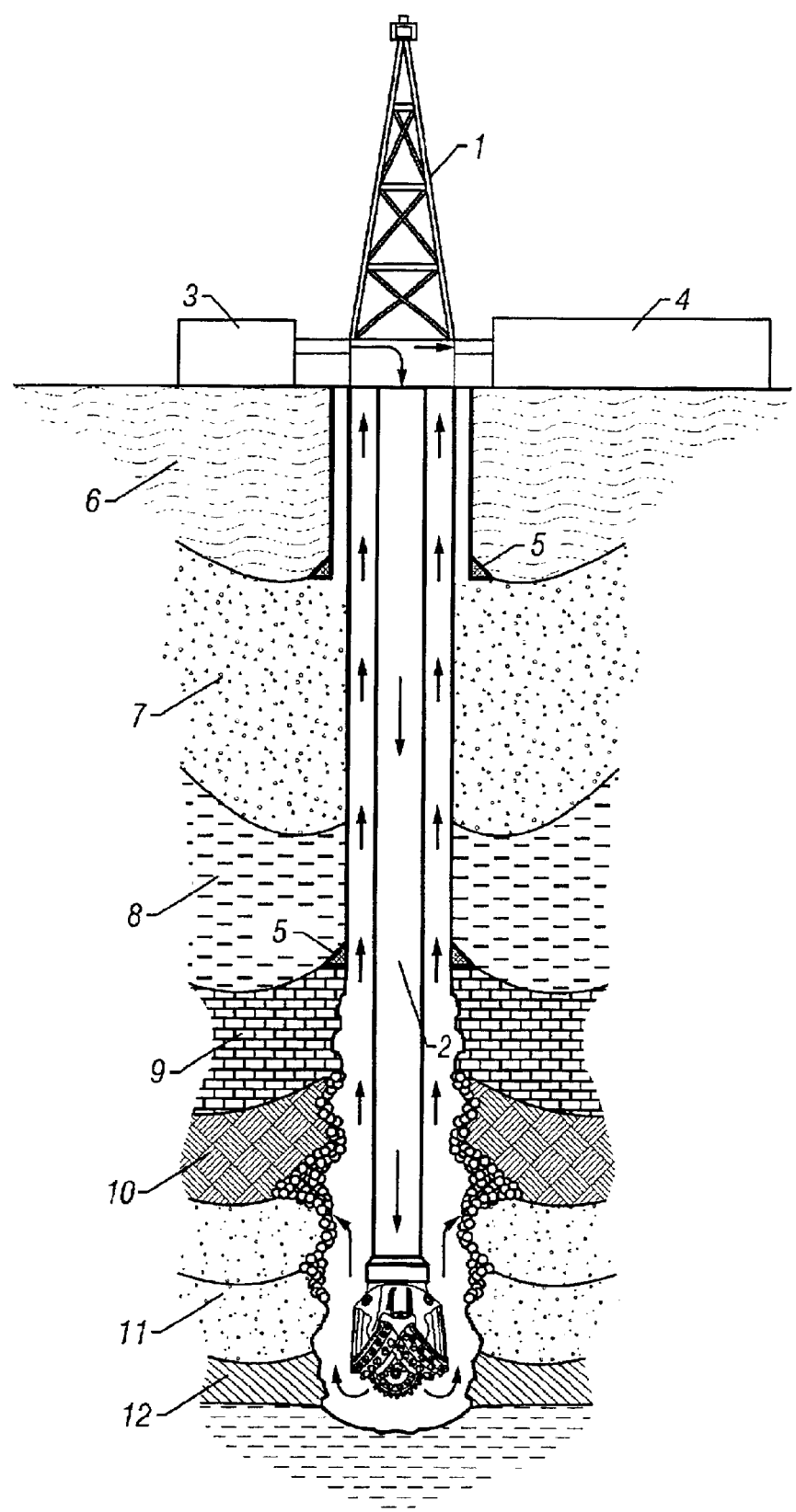
FIG. 1 is cross-sectional view of a drilling rig with down-hole strata.

In accordance with one illustrative embodiment of our invention, certain inorganic and water and oil wettable ground elastomeric crumb rubber materials are effective in oil base, synthetic oil base and water base well working fluids to decrease the seepage loss or spurt loss thereof.

The ground elastomeric crumb rubber material which is useful in this invention is that which has been re-processed from the original vulcanized rubber source, generally old tires, and is ground to a size ranging from 0.4 microns to about 2000 microns. The material is screened and air separated, insuring the desired sizes.

The inorganic ground elastomeric crumb rubber sealant material is then treated to render it oil and water wettable. Such treatments may be chemical, thermal, mechanical or combinations thereof. The preferred method is to treat the material with a surfactant. However, the extent of surface treatments must not be such as to render the ground elastomeric crumb rubber materials incapable of being wetted when agitated with water.

The inorganic water and oil wettable characteristic of the ground elastomeric crumb rubber material is very important as it allows this material to be utilized in oil base, synthetic oil base and water base well working fluids. Treated properly, the ground elastomeric crumb rubber material readily wets in water containing a surfactant or upon agitation to reduce the seepage or spurt loss or aqueous well working fluids. Furthermore the ground elastomeric crumb rubber material is effective in all aqueous well working fluids, including saturated salt fluids, calcium based fluids and the like.

The well working compositions of our invention can be prepared by adding the ground elastomeric crumb rubber material to any water base, diesel oil base or synthetic oil base well working fluid. A water base well working fluid will generally contain a suspension agent, such as a commercial clay or polymeric viscosifier, weight material (which may be insoluble—such as barite, galena, hematite or the like, or which may be soluble, such as sodium chloride, potassium chloride, calcium chloride, calcium bromide, zinc bromide, combinations thereof, and the like), fluid loss control agents, such as lignite, starch, carboxymethyl cellulose, carboxymethyl starch, polyacrylates and other polymers, and other additives such as viscosity control agents, lubricants, emulsifiers, lost circulation materials, oil and other functional additives.

Oil and synthetic oil base well working fluids will generally contain additives, which provide the same or similar functions, with the exception of the lubricants. Suspension agents are the organophilic clays. Representative weight materials are the insoluble materials enumerated above for water base well working fluids. Representative fluid loss control agents are asphaltic materials, organophilic humates, organophilic lignosulfonates, various polymers and the like. Emulsifiers range from calcium soaps, such as calcium tallate, fatty amides, partial fatty amides of polyamines, and the like.

Another embodiment of the invention is a method to decrease the seepage or spurt loss of a well working fluid, particularly drilling fluid. The method comprises adding to the well working fluid a quantity of ground elastomeric crumb rubber sealant material, sufficient to effect such decrease. Generally, there will be required from about 1 pound per 42-gallon oilfield barrel (ppb) to about 100 ppb., with the preferred range being from about 2 ppb to about 20 ppb.

A high boiling point liquid hydrocarbon of the type used in oil base well working fluids, such as diesel or synthetic oil, can be added to any water base well working fluid containing the ground elastomeric crumb rubber sealant material, or to which the ground elastomeric crumb rubber sealant material is to be added. The ground elastomeric crumb rubber sealant material is coated by the oil and concentrates it in the filter cake on the sides of the well, thus further decreasing the whole mud loss from the well working fluid. Generally, up to 20 ppb oil can be added.

Figure 2:
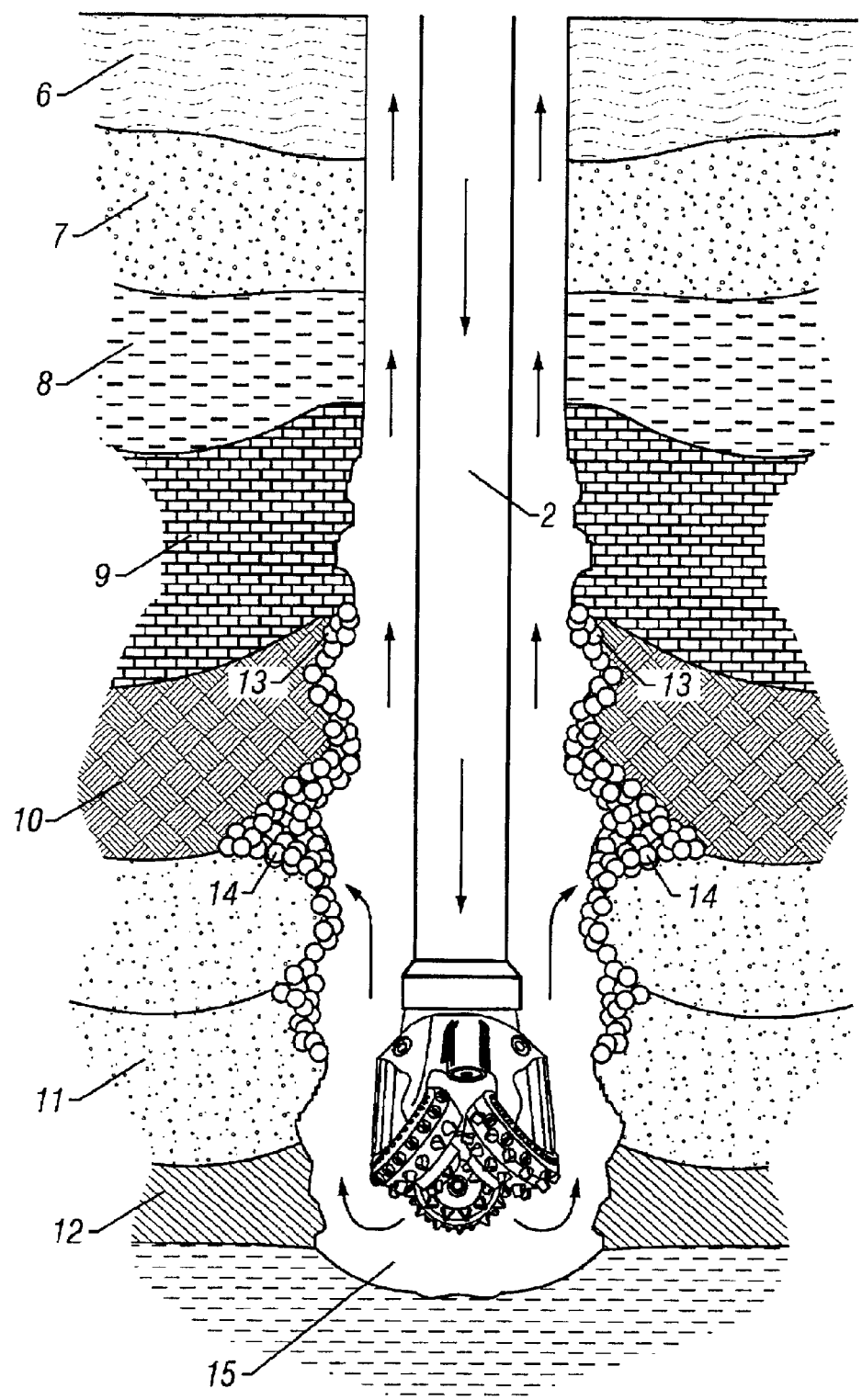
FIG. 2 is a detailed view of down-hole strata during a drilling operation.

FIGS. 1 and 2 depict how a drilling fluid is used according to the present invention. The desired quantity of ground elastomeric crumb rubber sealant material, as detailed above, is put through a material mixing hopper apparatus, with well working fluids being pumped through said apparatus at the same time. The ground elastomeric crumb rubber sealant material is thoroughly mixed into the well working fluid and then pumped with mud pump 3 to a pressure ranging from 100 pounds per square inch to 4,000 pounds per square inch. The mixture of well working fluid and ground elastomeric crumb rubber sealant material is thus forced through drill string 2 and drill bit 15 and is forced into subterranean strata formations that possess a weaker or lesser pressure than that being exerted by the hydrostatic pressure (head) exerted by the column of well working fluid.

As the mixture of well working fluid and ground elastomeric crumb rubber sealant material is pumped through this "pressure differential" situation, whole volumes of well working fluid containing the added amount of the ground elastomeric crumb rubber sealant material are forced into the weaker or lower pressured subterranean sand pore spaces and formations by the pumping pressure force, as well as by the normal hydrostatic column head of pressure of well working fluid when pumping pressure is stopped. As the well working fluid containing the ground elastomeric crumb rubber sealant material is forced into said sand formations, the ground elastomeric crumb rubber sealant material, being deformed from the pumping action pressure enters the sand formation, and as the pumping pressure is removed, as is the normal case, the deformed particles of the ground elastomeric crumb rubber sealant material return to the original non-deformed shape and are "trapped" as a result in said subterranean sand formation.

As an illustration, the figures depict a typical hole penetrating several strata. Below drilling rig 1 there are "gumbo" formations 6, sand formations 7, shale and sandstone formations 8, sand and shale formations 9, depleted sand formations 10, and sand, shale, and limestone formations 11. At the bottom of the hole is the oil and gas production zone 12. Along the well bore over most of the depth is wall cake 13. Placed at varying depths are casing sets 5, which cover the walls of the hole in order to protect the surface sands. At various points along the hole are sealed depleted formations 14, plugged by the ground elastomeric crumb rubber sealant material. After leaving drill string 2, the drilling fluid is pushed back up the hole by the pressure induced by mud pump 3. There, the fluid enters return mud chamber 4, where it can be analyzed and prepared for recirculation.

The following non-limiting examples are given to further illustrate the invention.

EXAMPLE 1

A ground elastomeric crumb rubber sealant material was prepared by treating the ground and sized material with a surfactant solution at 0.25%, by weight, at a temperature ranging from about 125 degrees Fahrenheit to about 175 degrees Fahrenheit for about 15 to 30 minutes in an apparatus designed to tumble the ground elastomeric crumb rubber sealant materials. Thereafter the treated materials were air screened, separated and classified. The result is a ground elastomeric crumb rubber sealant material that is inorganic and oil and water wettable.

The ground elastomeric crumb rubber sealant material was mixed into an 11.0 pound per gallon (ppg) lignosulfonate water base well working drilling fluid (mud), in various amounts as listed in Table 1. (Specific comparison testing was performed on each sample, as described herein.) Thereafter the standard API RP 13B rheology was determined.

The ability of the drilling fluid to seal off a porous sand was then evaluated in the following manner: (1) An aloxite disc filtering media (manufactured circular stone filtering media) of 10 darceys (approximately 35 microns in size) was soaked in fresh water for 10 minutes. (2) The surface of the aloxite disc was then blotted dry with a paper towel, then inserted into a Permeability Plugging Apparatus (PPA). The PPA is commercially available through OFI Testing Equipment in Houston, Tex. (3) A 350 ml., sample of the well working fluid (mud) containing the various concentrations of the ground elastomeric crumb rubber sealant material was then poured into the PPA; (4) The PPA lid was then secured onto the PPA, and (5) The PPA unit was heated electrically to 250 degrees Fahrenheit, then (6) A hand operated hydraulic oil pump was used to apply 2500 psi onto the PPA, then (7) The initial spurt loss was recorded when the pressure unit showed 2500 psi., the (8) The pressure was allowed to remain on the PPA for a duration of 30 total minutes, the (9) The fluid loss that had accumulated for the duration of the total 30 minutes was measured and recorded as double the amount shown (as per the procedure from the manufacturer), then (10) the initial spurt loss value and the total fluid loss value (with the value doubled) were then added together to give the total PPA value. The values for each concentration sample are listed for comparison in Table 1.

EXAMPLE 2

A ground elastomeric crumb rubber sealant material was prepared by treating the ground and sized material with a surfactant solution at 0.25%, by weight, at a temperature ranging from about 125 degrees Fahrenheit to about 175 degrees Fahrenheit for about 15 to 30 minutes in an apparatus designed to tumble the ground elastomeric crumb rubber sealant materials. Thereafter the treated materials were air screened, separated and classified. The result is a ground elastomeric crumb rubber sealant material that is inorganic and oil and water wettable.

The ground elastomeric crumb rubber sealant material was mixed into an 11.0 pound per gallon (ppg) diesel oil base well working drilling fluid (mud), in various amounts as listed in Table 2. (Specific comparison testing was performed on each sample, as described herein.) Thereafter the standard API RP 13B rheology was determined. The ability of the drilling fluid to seal off a porous sand was then evaluated as in example 1, as shown herein. The values for each concentration sample are listed for comparison in Table 2.

EXAMPLE 3

A ground elastomeric crumb rubber sealant material was prepared by treating the ground and sized material with a surfactant solution at 0.25%, by weight, at a temperature ranging from about 125 degrees Fahrenheit to about 175 degrees Fahrenheit for about 15 to 30 minutes in an apparatus designed to tumble the ground elastomeric crumb rubber sealant materials. Thereafter the treated materials were air screened, separated and classified. The result is a ground elastomeric crumb rubber sealant material that is inorganic and oil and water wettable.

The ground elastomeric crumb rubber sealant material was mixed into an 11.0 pound per gallon (ppg) synthetic oil base well working drilling fluid (mud), in various amounts as listed in Table 3. (Specific comparison testing was performed on each sample, as described herein.) Thereafter the standard API RP 13B rheology was determined. The ability of the drilling fluid to seal off a porous sand was then evaluated as in example 1 and 2, as shown herein. The values for each concentration sample are listed for comparison in Table 3.

G.E.C.R.S.M.—Ground Elastomeric Crumb Rubber Sealant Material

TABLE 1

Water Base Well Working Fluid

|  | Comparative Example 1 | A | B | C | D | E | F |
|---|---|---|---|---|---|---|---|
| G.E.C.R.S.M., ppb. | 0 | 2 | 6 | 10 | 20 | 50 | 50 |
| Surfactant, ppb | 0 | 0 | 0 | 0 | 0 | 0 | 10 |
| Plastic Viscosity, cp. | 22 | 22 | 23 | 26 | 29 | 68 | 62 |
| Yield Point, lb/100 sq ft | 11 | 11 | 12 | 14 | 27 | 77 | 69 |
| Spurt Loss Value | 12.8 | 4.6 | 4.0 | 3.2 | 2.0 | 1.2 | 1.2 |
| Fluid Loss Value (× 2) | 18 | 12.8 | 10.8 | 10.0 | 8.4 | 3.0 | 3.0 |
| Total PPA Value | 30.8 | 17.4 | 14.8 | 13.2 | 10.4 | 4.2 | 4.2 |
| Disc Size (Darcy) | 10 | 10 | 10 | 10 | 10 | 10 | 10 |
| Time of Test, min | 30 | 30 | 30 | 30 | 30 | 30 | 30 |
| Pressure, psi (× 100 psi) | 25 | 25 | 25 | 25 | 25 | 25 | 25 |

TABLE 2

Diesel Oil Base Well Working Fluid

|  | Comparative Example 2 | A | B | C | D | E | F |
|---|---|---|---|---|---|---|---|
| G.E.C.R.S.M., ppb. | 0 | 2 | 6 | 10 | 20 | 50 | 50 |
| Surfactant, ppb | 0 | 0 | 0 | 0 | 0 | 0 | 10 |
| Plastic Viscosity, cp. | 20 | 19 | 21 | 25 | 29 | 65 | 62 |
| Yield Point, lb/100 sq ft | 11 | 10 | 12 | 14 | 27 | 71 | 68 |
| Spurt Loss Value | 10.8 | 4.0 | 3.8 | 3.2 | 2.0 | 1.2 | 1.2 |
| Fluid Loss Value (× 2) | 14.8 | 12.2 | 10.2 | 9.6 | 8.0 | 2.8 | 2.8 |
| Total PPA Value | 25.6 | 16.2 | 14.0 | 12.8 | 10.0 | 4.0 | 4.0 |
| Disc Size (Darcy) | 10 | 10 | 10 | 10 | 10 | 10 | 10 |
| Time of Test, min | 30 | 30 | 30 | 30 | 30 | 30 | 30 |
| Pressure, psi (× 100) | 25 | 25 | 25 | 25 | 25 | 25 | 25 |

TABLE 3

Synthetic Oil Base Well Working Fluid

|  | Comparative Example 3 | A | B | C | D | E | F |
|---|---|---|---|---|---|---|---|
| G.E.C.R.S.M., ppb. | 0 | 2 | 6 | 10 | 20 | 50 | 50 |
| Surfactant, ppb | 0 | 0 | 0 | 0 | 0 | 0 | 10 |
| Plastic Viscosity, cp. | 24 | 19 | 21 | 25 | 29 | 65 | 62 |
| Yield Point, lb/100 sq ft | 12 | 10 | 12 | 14 | 27 | 71 | 68 |
| Spurt Loss Value | 9.8 | 3.8 | 3.2 | 3.0 | 1.8 | 1.0 | 1.0 |
| Fluid Loss Value (× 2) | 12.8 | 12.0 | 10.0 | 9.8 | 8.0 | 2.2 | 2.0 |
| Total PPA Value | 23.6 | 15.8 | 13.2 | 12.8 | 9.8 | 3.2 | 3.0 |
| Disc Size (Darcy) | 10 | 10 | 10 | 10 | 10 | 10 | 10 |
| Time of Test, min | 30 | 30 | 30 | 30 | 30 | 30 | 30 |
| Pressure, psi (× 100) | 25 | 25 | 25 | 25 | 25 | 25 | 25 |

There are of course other alternate embodiments that are obvious from the foregoing descriptions of the invention, which are intended to be included within the scope of the invention, as defined by the following claims.

I claim:

1. An oil base well working fluid comprising a major proportion and a minor proportion of ground elastomeric crumb rubber sealant material, wherein said sealant material:
   (a) has a particle size ranging from about 0.4 microns to about 2000 microns; and
   (b) is oil and water wettable.

2. The oil base well working fluid of claim 1 wherein the amount of said ground elastomeric crumb rubber sealant material is from about 1 to about 80 pounds per 42 gallon oilfield barrel of said fluid.

3. The oil base well working fluid of claim 1, further comprising a fluid loss additive.

4. An oil base well working fluid comprising:
   (a) a major proportion of oil and a minor proportion of ground elastomeric crumb rubber sealant material, said material having a particle size ranging from about 0.4 microns to about 2000 microns; and
   (b) a fluid loss additive selected from the group consisting of asphaltic materials, organophilic humates, and organophilic lignosulfonates.

5. A water base well working fluid comprising a major portion of water and minor portion of ground elastomeric crumb rubber sealant material, wherein said ground elastomeric crumb rubber sealant material:
   (a) has a particle size ranging from about 0.4 microns to about 2000 microns; and
   (b) is oil and water wettable.

6. The water base well working fluid from claim 5 wherein the amount of said ground elastomeric crumb rubber sealant material is from about 2 to about 50 pounds per 42 gallon oilfield barrel of said fluid.

7. The water base well working fluid of claim 5 further comprising a fluid loss additive.

8. A water base well working fluid comprising:
   (a) a major portion of water and minor portion of ground elastomeric crumb rubber sealant material, said ground elastomeric crumb rubber sealant material having a particle size ranging from about 0.4 microns to about 2000 microns; and (b) a fluid loss additive selected from the group consisting of lignite, starch, carboxymethyl cellulose, carboxymethyl starch, and polyacrylates.

9. A method of decreasing seepage and whole mud loss to subterranean formations during a drilling process having a drill string, said method comprising the steps of:

providing a drilling fluid composition comprising oil and water wettable ground elastomeric crumb rubber sealant material, said material having a particle size ranging from 0.4 microns to about 2000 microns; and circulating said drilling fluid in said drill string during said drilling process.

10. The method of claim 9 wherein the amount of said ground elastomeric crumb rubber sealant material is from about 1 to about 80 pounds per 42 gallon oilfield barrel of said drilling fluid.

11. The method of claim 9 wherein said drilling fluid is an oil base well working fluid further comprising a fluid loss additive.

12. The method of claim 9 wherein said drilling fluid is a water base well working fluid containing a fluid loss additive.

13. The oil base well working fluid of claim 1 wherein said material is at concentrations of about 2 pounds per 42 gallon oilfield barrel to about 20 pounds per barrel.

14. The oil base well working fluid of claim 1 wherein said material has a particle size ranging from about 0.5 microns to about 425 microns.

15. The oil base well working fluid of claim 1 wherein said sealant material has been treated with a surfactant.

16. The water base well working fluid of claim 5 wherein said sealant material has been treated with a surfactant.

* * * * *